United States Patent
Kalamatianos et al.

(10) Patent No.: US 10,908,991 B2
(45) Date of Patent: Feb. 2, 2021

(54) BIT ERROR PROTECTION IN CACHE MEMORIES

(71) Applicant: Advanced Micro Devices, Inc., Santa Clara, CA (US)

(72) Inventors: John Kalamatianos, Arlington, MA (US); Shrikanth Ganapathy, Mountain View, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 208 days.

(21) Appl. No.: 16/123,489

(22) Filed: Sep. 6, 2018

(65) Prior Publication Data

US 2020/0081771 A1     Mar. 12, 2020

(51) Int. Cl.
    *G06F 11/10*     (2006.01)
    *G06F 12/0815*   (2016.01)
    *G06F 12/0804*   (2016.01)

(52) U.S. Cl.
    CPC ...... *G06F 11/1064* (2013.01); *G06F 11/1044* (2013.01); *G06F 12/0804* (2013.01); *G06F 12/0815* (2013.01)

(58) Field of Classification Search
    CPC .................................................. G06F 11/1064
    USPC ......................................... 714/746, 748, 751
    See application file for complete search history.

(56) References Cited

U.S. PATENT DOCUMENTS

| | | | | |
|---|---|---|---|---|
| 6,772,383 B1* | 8/2004 | Quach | .................. | G06F 11/1064 365/49.15 |
| 2014/0019823 A1* | 1/2014 | Ramirez | ............... | G06F 1/3296 714/755 |
| 2015/0242337 A1* | 8/2015 | Aggarwal | ........... | G06F 12/0864 711/145 |
| 2016/0147598 A1* | 5/2016 | Muralimanohar | .. | G06F 11/1064 714/768 |

OTHER PUBLICATIONS

D. Dreslinski et al., "Near-Threshold Computing: Reclaiming Moore's Law Through Energy Efficient Integrated Circuits," Proceedings of the IEEE, Feb. 2010.
B. Zhai et al., "Energy efficient near-threshold chip multiprocessing," Proceedings of the International Symposium on Low Power Design, Aug. 2007.
G. Chen et al., "Yield-driven near-threshold SRAM design," Proceedings of the International Conference on Computer-Aided Design, Oct. 2008.

(Continued)

*Primary Examiner* — Fritz Alphonse
(74) *Attorney, Agent, or Firm* — Park, Vaughan, Fleming & Dowler LLP

(57) ABSTRACT

A computing device having a cache memory that is configured in a write-back mode is described. A cache controller in the cache memory acquires, from a record of bit errors that are present in each of a plurality of portions of the cache memory, a number of bit errors in a portion of the cache memory. The cache controller detects a coherency state of data stored in the portion of the cache memory. Based on the coherency state and the number of bit errors, the cache controller selects an error protection from among a plurality (Continued)

of error protections. The cache controller uses the selected error protection to protect the data stored in the portion of the cache memory from errors.

25 Claims, 11 Drawing Sheets

(56) References Cited

OTHER PUBLICATIONS

D. P. Wang et al., "A 45nm Dual-Port SRAM with Write and Read Capability Enhancement," Proceedings of the System on Chip Conference, Sep. 2007.
M. Ansari et al., "A Near-threshold 7T SRAM Cell with High Write and Read Margins and Low Write Time for Sub-20Nm FinFET Technologies," Integration, VLSI Journal, Oct. 2014.
A. Alameldeen et al., "Energy-Efficient Cache Design Using Variable Strength Error-Correcting Codes," Proceedings of the International Symposium on Computer Architecture, Jun. 2011.
W. Zhang et al., "ICR: In-Cache Replication for enhancing Cache Reliability," Proceedings of the 2003 International Conference on Dependable Systems and Networks, Jun. 2003.
J. Kim et al., "Multi-bit Error Tolerant Caches Using Two-Dimensional Error Coding," Proceedings of the 40th Annual IEEE/ACM International Symposium on Microarchitecture, Dec. 2007.
D.H. Yoon and M. Erez, "Memory Mapped ECC: Low-Cost Error Protection for Last Level Caches," Proceedings of International Symposium on Computer Architecture, Jun. 2009.
N. N. Sadler and D. J. Sorin, "Choosing an Error Protection Scheme for a Microprocessor's L1 Data Cache," Proceedings of International Conference on Computer Design (ICCD), Oct. 2006.
S. Kim. "Area-Efficient Error Protection for Caches," Proceedings of the Conference on Design Automation and Test in Europe (DATE), Mar. 2006.
L. Li et al., "Soft Error and Energy Consumption Interactions: A Data Cache Perspective," Proceedings of International Symposium on Low Power Electronics and Design (ISLPED), Aug. 2004.
C. Wilkerson et al., "Trading Off Cache Capacity for Reliability to Enable Low Voltage Operation," Proceedings of the 35th Annual International Symposium on Computer Architecture (ISCA), Jun. 2008.
M. Zhang et al., "Reliable Ultra Low Power Cache Design for Many-Core Systems," IEEE Transactions on Circuits and Systems II, Jul. 2012.
H. R. Ghasemi et al., "Low-voltage on-chip cache architecture using heterogeneous cell sizes for high-performance processors," Proceedings of the IEEE International Symposium on High-Performance Computer Architecture, Feb. 2011.
J. Kulkarni et al., "A 160 mV Robust Schmitt Trigger Based Subthreshold SRAM," IEEE Journal of Solid-State Circuits, Nov. 2006.
M. Qureshi and Z. Chisthi, "Operating SECDED-Based Caches at Ultra-Low Voltage with FLAIR," Proceedings of DSN Conference, Jun. 2013.
A. Bhavnagarwala et al., "A 400mV Active VMIN, 200mV Retention VMIN, 2.8 GHz 64Kb SRAM with a 0.09 um2 6T bitcell in a 16nm FinFET CMOS Process," IEEE Symposium on VLSI Circuits, Jun. 2016.
J. Abella et al., "Low vccmin fault-tolerant cache with highly predictable performance," Proceedings of the International Symposium on Microarchitecture, Dec. 2010.
A. Ansari et al., "Archipelago: A polymorphic cache design for enabling robust near-threshold operation," Proceedings of the International Symposium on High Performance Computer Architecture (HPCA), Feb. 2011.
Z. Chishti et al., "Improving Cache Lifetime Reliability at Ultra Low Voltages," International Symposium on Microarchitecture, Dec. 2009.

\* cited by examiner

| HISTORY | C-STATE | ERROR PROTECTION |
|---|---|---|
| NO BIT ERRORS DETECTED | CLEAN | 4-BIT PARITY |
| NO BIT ERRORS DETECTED | DIRTY | 4-BIT PARITY + 11-BIT SECDED ECC |
| SINGLE-BIT BIT ERROR DETECTED | CLEAN | 4-BIT PARITY + 11-BIT SECDED ECC |
| SINGLE-BIT BIT ERROR DETECTED | DIRTY | 4-BIT PARITY + 21-BIT DECTED ECC |
| MULTI-BIT BIT ERROR DETECTED | -- | PORTION DISABLED |
| UNKNOWN NUMBER OF BIT ERRORS | CLEAN | 16-BIT PARITY + 11-BIT SECDED ECC |
| UNKNOWN NUMBER OF BIT ERRORS | DIRTY | AVOID (OR WRITE-THROUGH) |

FIG. 8

BIT ERROR PROTECTION IN CACHE MEMORIES

GOVERNMENT RIGHTS

This invention was made with government support under prime contract no. DE-AC52-07NA27344, subcontract no. B620717 awarded by the Department of Energy (DOE). The government has certain rights in this invention.

BACKGROUND

Related Art

Most modern computing devices include at least one level of cache memory (or "cache") in addition to a main memory. Generally, the main memory is a higher-capacity, slower-access memory, such as a dynamic random access (DRAM) memory, that can store a large number of copies of data and instructions, and the caches are smaller-capacity, faster-access memories that are used for storing a limited number of copies of data. Caches are often closer to the functional blocks in the computing device that rely on the data and instructions and are communicatively coupled to the functional blocks via high-speed interfaces. Caches are also typically implemented using higher-speed memory circuits, such as static random access memory (SRAM) integrated circuits or other types of memory circuits.

During operation, the memory circuits in a cache can consume a significant portion of the overall electrical power consumed by a computing device. Because power consumption is an important concern for computing devices, designers have proposed various techniques for reducing the power consumption of memory circuits in caches. For example, designers have suggested lowering supply voltages for memory circuits in caches in order to reduce the power consumed by the memory circuits. Unfortunately, lowering supply voltages causes memory circuits in caches to become more susceptible to bit errors. This is true because lower supply voltages are associated with reduced noise margins for the memory elements in the memory circuits. In other words, at lower supply voltages, the memory elements are more susceptible to faults arising from process variation and/or other effects. These "low-voltage faults" are permanent at a given supply voltage (or, more precisely, at a combination of supply voltage, frequency, and temperature), in that memory elements experiencing the low-voltage faults will continue to experience the same low-voltage faults as long as the supply voltage is used (again, as long as a particular combination of supply voltage, frequency, and temperature is used/occurs).

BRIEF DESCRIPTION OF THE FIGURES

FIG. 8 presents a table illustrating error protections that are selected based on a number of bit errors in a portion of the cache and a coherency state of data stored in the portion of the cache in accordance with some embodiments.

Throughout the figures and the description, like reference numerals refer to the same figure elements.

DETAILED DESCRIPTION

Figure 1:
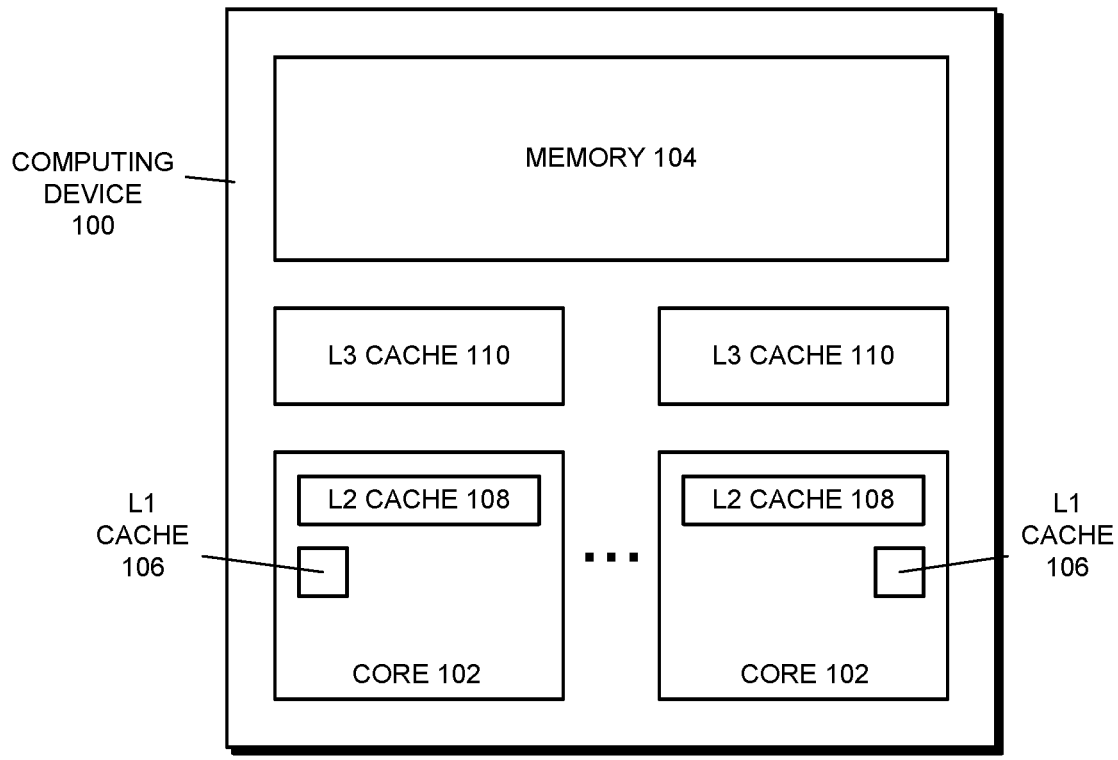
FIG. 1 presents a block diagram illustrating a computing device in accordance with some embodiments.

The following description is presented to enable any person skilled in the art to make and use the described embodiments, and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Overview

In the described embodiments, a cache memory (or "cache") in a computing device can experience "bit errors." Bit errors occur when memory elements in the cache, due to improper or unexpected circuit operation, hold incorrect values for bits of stored data and/or corrupt bits of data as the data is stored to or read from the memory elements and thus return erroneous values during memory accesses. The described embodiments perform operations for protecting data stored in the cache from bit errors. In the described embodiments, the cache is protected from bit errors while operating in a write-back mode, which is an operating mode in which modified data is retained in the cache and not immediately written back to lower levels of cache memories and/or memory. In the write-back mode, therefore, a modified copy of data held in the cache may be the only current and correct copy of the data available in the computing device.

As part of protecting data stored in the cache from bit errors, the described embodiments keep history records associated with portions of the cache, where a "portion" of the cache is a block of memory circuits (i.e., storage elements within the memory circuits) in the cache of a specified size. For example, in some embodiments, a portion is sufficient to store data for a single 64-byte cache line (as used herein, "data" is a generic term that can cover information such as data, instructions, etc.). Each of the history records includes a representation of a number of bit errors detected in the corresponding portion of the cache. For example, each history record may indicate, using respective two-bit values, that no bit error, a single-bit bit error, or a multi-bit bit error was detected in the corresponding portion of the cache. In some embodiments, a check for bit errors is performed and the history record is updated upon accessing (e.g., reading, writing, moving, etc.) or evicting data in portions of the cache. By performing the check for bit errors at access or eviction, these embodiments are able to keep the history record without performing a separate time-consuming memory test such as a memory built-in self test (mBIST).

The described embodiments determine, based on each history record and a coherency state of the data in the corresponding portion, a type of error protection to be used to safeguard the data in the corresponding portion. For example, in some embodiments, when the history record indicates that no bit error has been detected for a given portion of the cache and the data in the given portion is in a coherency state in which the data may not be modified (i.e., the data is known to be "clean"), a parity check alone is used as the error protection. As another example, in some embodiments, when the history record indicates that a single-bit bit error has been detected for a given portion of the cache and the data in the given portion is in a coherency state in which the data may be modified (i.e., the data may be "dirty"), both an error correction code (ECC) check that can correct a two-bit error (e.g., a double error correct, triple error detect or "DECTED" ECC check) and a parity check are used as the error protection. As another example, when the history record indicates that a multi-bit bit error has been detected for a given portion of the cache, some embodiments prevent data from being stored in the given portion, or "disable" the given portion, regardless of the coherency state of the data.

In the described embodiments, at least some of the above-described error correction codes and/or parity check bits are stored in an error protection cache. For example, each entry of a set of entries in the error protection cache may include N bits of capacity (e.g., 23 bits, 25 bits, etc.) that can be used for storing ECC values (i.e., ECC check bits and/or ECC metadata for correcting errors) and/or parity check bits. In some embodiments, the individual bits of each entry in the error protection cache are used for storing either ECC values or parity check bits (or are unused) based on the error protection that is selected for protecting an associated portion of the cache. For example, for a first error protection mode for a given portion of the cache, the associated entry in the error protection cache may be used to store M parity check bits (where M<N) and N-M bits of an ECC value, while in a second error protection mode, the bits of the entry in the error protection code cache are used to store K bits of an ECC value (where K<N), with N-K bits being unused (so that parity check bits are not stored in the entry in the error protection cache for the second error protection mode). In some embodiments, the particular bits used for storing ECC values and/or parity check bits in entries in the error protection cache are dynamically reconfigurable, as bit errors are detected (or not) in associated portions of the cache and/or as data coherency state changes occur for data in associated portions of the cache.

In some embodiments, the number of entries in the error protection cache is smaller than the number of portions of the cache. For example, the error protection cache may include a number of entries that is 20% of the number of portions in the cache. The entries in the error protection cache are dynamically mapped to portions of the cache in which specified patterns of bit errors exist (e.g., single-bit bit errors, unknown numbers of bit errors, etc.). In other words, each entry in the error protection cache is not fixedly associated with a particular portion of the cache, but instead may be assigned to different portions of the cache as needed. By dynamically mapping the entries in this way, the described embodiments provide the safeguard of error protection(s) for a subset of the portions of the cache, without requiring the overhead associated with storing error correction codes for all of the portions of the cache (in terms of circuit area, electrical power consumed, etc.). In some embodiments, the limited number of entries in the error protection cache is adequate to protect data in the cache because certain bit errors (e.g. low supply voltage bit errors, etc.) occur for only a subset of the portions of the cache.

Using history records and the coherency state of data to select the type of error protection for portions of caches enables the described embodiments to protect caches from bit errors with lower protection overhead than existing techniques. For example, using error correction codes only for portions of the cache that are detected as having specified combinations of bit errors and data coherency states provides a similar level of protection without requiring that error correction codes be maintained for all of the portions of the cache. As another example, using different error protections for data in different coherency states enables the protection of the data while the cache is operating in a write back mode (for which, again, a modified copy of data in the cache may be the only current copy). In this way, a cache can be reliably operated without paying the cost, in terms of power consumption, computational effort, circuit area, etc., of maintaining error protection metadata for the entire cache. In addition, the described embodiments avoid the need for other difficult and/or expensive workarounds for avoiding the effect of bit errors (e.g., specially designed memory circuits, etc.). This in turn enables lower cost and complexity design, fabrication, and operation for the cache and the computing device.

Computing Device

FIG. 1 presents a block diagram illustrating a computing device 100 in accordance with some embodiments. As can be seen in FIG. 1, computing device 100 includes cores 102, memory 104, and a number of caches. Generally, the cores 102, memory 104, and caches are implemented in hardware, i.e., using various circuit elements and devices. For example, the cores 102, memory 104, and caches can be entirely fabricated on one or more semiconductor chips, including on one or more separate semiconductor chips, can be fashioned from semiconductor chips in combination with discrete circuit elements, can be fabricated from discrete circuit elements alone, etc. As described herein, some or all of cores 102, memory 104, and the caches perform operations associated with handling bit errors in one or more of the caches.

The cores 102 are functional blocks that perform computational and other operations (control, configuration, etc.) in computing device 100. Each core 102 includes elements such as a central processing units (CPU) or CPU cores, application specific integrated circuits (ASICs), general purpose graphics processing units (GPGPUs), field-programmable gate arrays (FPGA), etc. for performing the operations.

Memory 104 is a functional block that performs operations of a memory in computing device 100 (e.g., a "main memory"). Memory 104 includes memory circuits such as one or more of dynamic random access memory (DRAM), double data rate synchronous DRAM (DDR SDRAM), non-volatile random access memory (NVRAM), and/or other types of memory circuits for storing data and instructions for use by functional blocks in computing device 100, as well as control circuits for handling accesses of the data and instructions that are stored in the memory circuits.

The caches include a hierarchy of cache memory (or "cache") functional blocks, each of which is used for storing limited numbers of copies of data and instructions for access by other functional blocks in computing device 100. The hierarchy of caches includes an L1 cache 106, L2 cache 108, and L3 cache 110 for each core 102. Each of L1 cache 106, L2 cache 108, and L3 cache 110 include memory circuits such as static random access memory (SRAM) memory circuits that are used for storing the copies of data and instructions, as well as control circuits for handling accesses of the memory circuits. Proceeding in the order L1 cache 106, L2 cache 108, and L3 cache 110, in some embodiments, each cache is larger in capacity (i.e., includes more memory circuits) and is located farther from the functional blocks that use the copies of data and instructions stored therein—and is slower to access. In other words, the L1 caches 106 can be the smallest of the caches and can be located most closely to the corresponding computational mechanisms, making the L1 caches 106 the fastest to access among the hierarchy of caches. In describing the caches in the hierarchy, the L1 caches 106 are described as the "highest" level in the hierarchy, with the L2 caches 108 and the L3 caches 110 in successively "lower" levels of the hierarchy.

In some embodiments, some or all of the caches in the hierarchy of caches are write-back caches (or are configured to operate as write-back caches). In these embodiments, when modified data is written from a core to a write-back cache, the data is not immediately written to a next-lower cache in the hierarchy and/or into memory 104. The data can be written back when the data is subsequently evicted from the write-back cache, when a coherency state changes from a state in which the data can be modified (e.g., the "modified" state of the MOESI protocol) to a state in which the data cannot be modified (e.g., the "shared" or "owned" states of the MOESI protocol), etc. Because the only correct and current copy of the data may be held in a write-back cache—i.e., after modification, but before write back—an unresolved bit error in the data in the write-back cache can corrupt the only copy of the data and cause serious errors in computing device 100. The described embodiments therefore perform operations for ensuring that bit errors in write-back caches are correctable and/or are otherwise handled using the ECC values and/or parity check bits.

Although embodiments are described with a particular arrangement of cores 102, some embodiments include a different number and/or arrangement of cores, as shown by the ellipsis in FIG. 1. For example, some embodiments have only one core, while other embodiments have five, eight, or another number of cores. Generally, the described embodiments can use any arrangement of cores that can perform the operations. In addition, although embodiments are described with a particular arrangement of caches, some embodiments include a different number and/or arrangement of caches. For example, some or all of the caches (e.g., L1 cache 106, etc.) may be implemented as separate instruction and data caches. As another example, some embodiments include different levels of caches, from only one level of cache to multiple levels of caches, and some or all of these caches may be located in a core 102 and/or external to the core 102. Generally, the described embodiments can use any arrangement of caches that can perform the operations.

Computing device 100 is simplified for illustrative purposes. In some embodiments, however, computing device 100 includes additional or different elements and mechanisms for performing the operations herein described and other operations. For example, computing device 100 can include power subsystems, media processing subsystems, input-output subsystems, communication subsystems, networking subsystems, display subsystems, etc.

Computing device 100 can be, or can be included in, any electronic device that performs computational operations. For example, computing device 100 can be, or can be included in, electronic devices such as desktop computers, laptop computers, wearable computing devices, tablet computers, virtual or augmented reality equipment, smart phones, servers, network appliances, toys, audio-visual equipment, home appliances, controllers, vehicles, etc., and/or combinations thereof.

Cache

Figure 2:
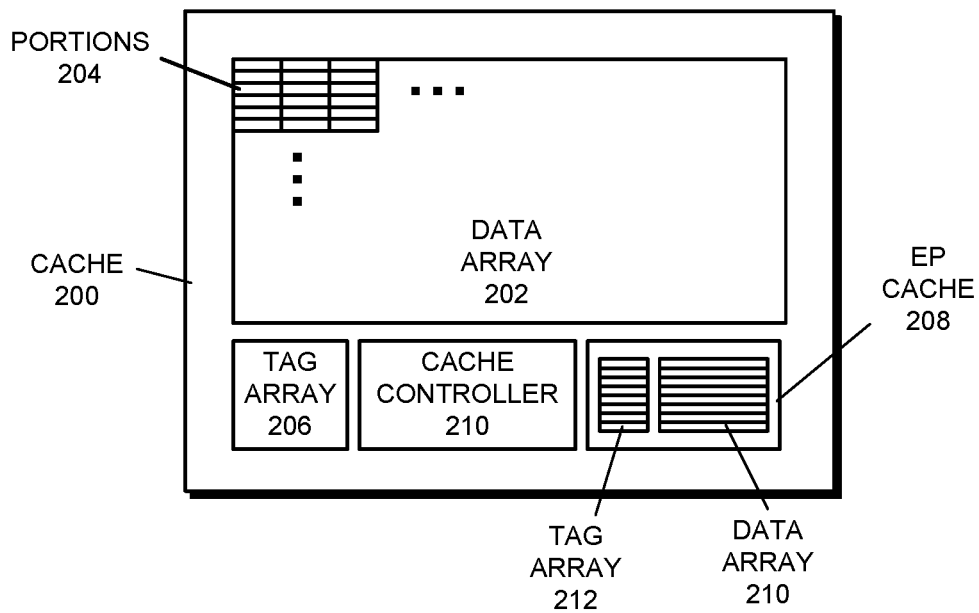
FIG. 2 presents a block diagram illustrating a cache in accordance with some embodiments.

FIG. 2 presents a block diagram illustrating a cache 200 in accordance with some embodiments. In some embodiments, some or all of L1 cache 106, L2 cache 108, and L3 cache 110 are implemented similarly to cache 200, i.e., include at least the functional blocks shown in FIG. 2.

As can be seen in FIG. 2, cache 200 includes data array 202, tag array 206, error protection (EP) cache 208, and cache controller 210. Data array 202 is a functional block that includes memory circuits (e.g., SRAM or another type of memory circuits) that are used for storing copies of data in cache 200 (i.e., for storing data and/or instructions). Data array 202 includes number of portions 204 (only some of which are shown in FIG. 2), each portion 204 including a subset of the memory circuits for storing data for a cache line (where a cache line is N bytes, N being 64, 128, or another value) and related information. In some embodiments, portions 204 are logically and/or physically arranged in or otherwise grouped as part of one or more divisions such as ways, sets, etc., as is known in the art.

Figure 3:
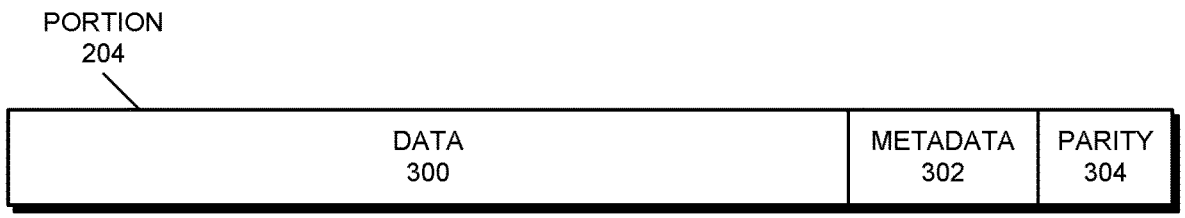
FIG. 3 presents a block diagram illustrating a portion of a cache in accordance with some embodiments.

FIG. 3 presents a block diagram illustrating a portion 204 in accordance with some embodiments. As can be seen in FIG. 3, portion 204 includes data 300, which is used for storing the data of a cache line—i.e., for storing a plurality of bits of the cache line in memory circuits in the portion. Portion 204 also includes metadata 302, which is used to store information about or relating to the data stored in data 300, the portion 204, etc. For example, metadata 302 can include valid bits, accessed bits, permission bits, etc. Portion 204 further includes parity 304, which is used to store parity information for performing parity checks on the data stored in data 300. The parity information includes a number of bits (e.g., four bits for a 64-byte cache line) that can be used during a parity check to detect bit errors in the data stored in data 300. For example, in some embodiments, segmented and interleaved parity is used. For segmented and interleaved parity, data to be stored in data 300 is logically divided into a number of overlapping segments (e.g., four) and a parity bit (or other information) is generated for each segment. The parity bits can then be stored in parity 304 and subsequently retrieved to be used during a parity check for detecting bit errors.

Tag array 206 is a functional block that includes memory circuits that are logically divided into a number of entries, each entry used to store address (or "tag") information that uniquely identifies data stored in a corresponding portion of data array 202 (so that each entry in tag array 206 is associated with a different portion 204 of data array 202), along with metadata and a corresponding history record. As data is stored in portions 204 of data array 202, corresponding entries in tag array 206 are updated with address information based on or derived from the addresses for the data. The address information in entries in tag array 206 is then used to determine, based on addresses for subsequently requested data, whether the requested data is present in data array 202 and/or other information about corresponding data in data array 202.

Figure 4:
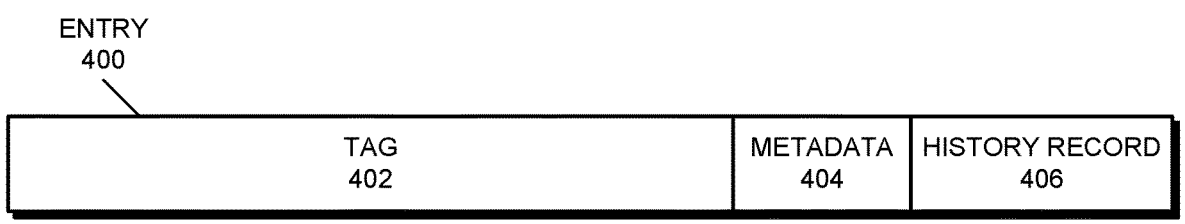
FIG. 4 presents a block diagram illustrating an entry in a tag array in accordance with some embodiments.

FIG. 4 presents a block diagram illustrating an entry 400 in tag array 206 in accordance with some embodiments. As can be seen in FIG. 4, entry 400 includes tag 402, metadata 404, and history record 406. Tag 402 is used to store address information based on or derived from an address of data stored in a corresponding portion 204 in data array 202. Metadata 404 is used to store information about or relating to the address information stored in tag 402, such as valid bits, permissions, etc. History record 406 is used to store a representation of a number of bit errors detected in the corresponding portion 204 (i.e., in the bits of data 300 in the corresponding portion 204). For example, in some embodiments, history record 406 is a two-bit value. In some of these embodiments, a value of 00 indicates that no bit error was/has been detected in the corresponding data 300, a value of 01 indicates that an unknown number of bit errors are present in the data 300, a value of 10 indicates that a single-bit bit error was/has been detected, and a value of 11 indicates that a multi-bit bit error was/has been detected. As described herein, history record 406 is used to determine an error protection to be used for the corresponding portion 204 or whether the corresponding portion 204 is to be disabled.

Figure 5:
FIG. 5 presents a block diagram illustrating an entry in an error protection cache in accordance with some embodiments.

Error protection cache 208 is a functional block that includes memory circuits that are logically divided into a number of entries in a data array 210, each entry used to store error protection data, as well as a tag array 212 and circuits for controlling and accessing data in the entries. FIG. 5 presents a block diagram illustrating an entry 500 in data array 210 in error protection cache 208 in accordance with some embodiments. As can be seen in FIG. 5, entry 500 includes error protection 502 and metadata 404. Error protection 502, as described in more detail below, is used to store data for an error protection that has been selected for a corresponding portion 204, i.e., an error correction code and/or parity information. Metadata 504 is used to store information about or relating to the data stored in error protection 502, such as valid bits, type of error protection, permissions, etc. Generally, error correction codes are used to detect and/or correct bit errors in a data stored in portions 204 of data array 202. For example, in some embodiments, the error correction codes are single-error correcting, double-error detecting or SECDED codes such as a Hamming code. Using a SECDED code, single-bit bit errors can be corrected and up to two-bit bit errors can be detected in corresponding data. The parity information includes a number of bits that are used for performing parity checks such as the above-described segmented and interleaved parity checks. Tag array 212 includes memory circuits that are used to store address information (or information based thereon) associated with a portion 204 with which the entry in the data array is associated. In some embodiments, using address information for a given portion 204, lookups are performed in tag array 212 to determine whether error protection cache 208 includes error protection data for the given portion 204. In some embodiments, metadata 504 is stored in tag array 212 instead of in entries 500 in data array 210.

In some embodiments, some or all of the individual memory circuits used for storing each entry in error protection cache 208 are interchangeably used to store, as the error protection data, either error correction codes or parity information. In these embodiments, depending on the error protection that is selected for an associated portion 204, the memory circuits are used to store bits of the error correction codes or the parity information. For example, assuming that each entry in error protection cache 208 includes sufficient memory circuits to store 23 bits of information, for a first type of error protection, the memory circuits for a given entry are used to store an eleven bit error correction code (e.g., a SECDED error correction code), with the remaining twelve bits of memory circuits unused. As another example, for a second type of error protection, the memory circuits in a given entry are used to store twelve parity check bits and an eleven bit error correction code. As yet another example, for a third type of error protection, the memory circuits in a given entry are used to store a twenty one bit error correction code (e.g., a DECTED error correction code), with the remaining memory circuits unused. In some embodiments, as the error protection is changed during operation, e.g., when a coherency state of data in an associated portion 204 changes, the configuration of the corresponding entry in error protection cache 208 is also changed. In this way, entries in error protection cache 208 can be used to store parity check values and/or error correction code values for any of various error protection modes.

In some embodiments, error protection data in entries in error protection cache 208 is used in combination with error protection data from other sources to form aggregate error protection data. For example, in some embodiments, parity check bits from parity 304 in a corresponding portion 204 are combined with parity check bits from an entry in error protection cache 208 to form an aggregate parity check bit value. In these embodiments, the aggregate parity check bit value can be longer/larger than parity 304 (which may be four bits), such as sixteen bits, eighteen bits, or another bit length—and thus can be used to perform more detailed parity checks and/or for performing parity checks on larger data 300 values in portions 204 and/or for smaller chunks/sub-portions of data 300 values in portions 204 (i.e., with finer granularity).

In some embodiments, error protection cache 208 includes a smaller number of entries than there are portions 204 in data array 202. For example, error protection cache 208 may have a number of entries that is 20% of the number of portions in data array 202. In this case, if there were 500 portions in data array 202, there would be 100 entries in error protection cache 208. In some of these embodiments, the entries in error protection cache 208 are not permanently mapped to particular portions 204 of data array 202. Instead, each entry is configurably mapped to any of various portions 204 of data array 202. For example, in some embodiments, each entry in error protection cache 208 can be mapped to a different single portion 204 in data array 202 that has been determined to have at least a single-bit bit error.

In some embodiments, the configurable mapping of the entries in error protection cache 208 is dynamically updated or changed, i.e., updated at runtime as cache 200 operates. For example, when a transient single-bit bit error is detected in a portion 204 (e.g., due to a transient error such as a cosmic ray fault), an entry in error protection cache may be assigned or allocated to hold specified error protection information for the portion. When the single-bit bit error is subsequently determined to no longer be present and the error protection information is thus no longer needed for the portion 204, the entry in error protection cache 208 may be de-assigned, invalidated, etc. The entry can then be assigned to another portion 204 in data array 202 as needed.

Returning to FIG. 2, cache controller 210 is a functional block that performs various functions for controlling operations in cache 200. For example, cache controller 210 manages storing data to, invalidating data in, and evicting data from data array 202; performs lookups for data in tag array 206; handles coherency operations for cache 200; and/or responds to requests for data from cache 200. In some embodiments, cache controller 210 performs at least some of the operations for selecting an error protection for or disabling portions 204 in data array 202 based on bit errors and the coherency states of stored data as.

Although cache 200 shown in FIG. 2 is simplified for illustrative purposes, in some embodiments, cache 200 includes a different arrangement of functional blocks. Generally, cache 200 includes sufficient functional blocks to perform the operations herein described and other operations performed by caches. In addition, although portions 204 are described as storing data for a single cache line, in some embodiments, some or all of the portions 204 store part of a cache line (e.g., 32 bytes of a 64 byte cache line) or a block of two or more cache lines. In these embodiments, the operations herein described are adjusted to account for smaller or larger portion sizes, but are otherwise similar to what is described.

Although portion 204, entry 400, and entry 500 are shown as including metadata (i.e., metadata 302 in portion 204, metadata 404 in entry 400, and metadata 504 in entry 500), in some embodiments, metadata is not present in some or all of portion 204, entry 400, and entry 500 and/or different information is present in the metadata for some or all of portion 204, entry 400, and entry 500. Generally, portion 204, entry 400, and entry 500 include sufficient information to perform the operations herein described.

Error Correction Code

Although embodiments are described herein using SECDED error correction codes as an example, in some embodiments, other and/or additional error correcting codes are used. For example, double-error correcting, triple error detecting or DECTED codes, triple-error correcting, quadruple error detecting or TECQED codes, etc. In these embodiments, the history records and the various operations that use the history records are arranged or selected based on the particular variant of error correction code that is used. For example, in some embodiments where a DECTED error correcting code and a two-bit history record are used, a value of 01 indicates up to two bit errors have been detected in the corresponding portion, etc. In addition, functional blocks such as cache 200 may include a different number of and/or differently-arranged elements to account for larger parity check values, different error correction codes, etc. Generally, the described embodiments can use any form of error correction code.

Low Voltage Faults/Bit Errors

In some embodiments, one or more of the caches in computing device 100 (e.g., L1 cache 106, L2 cache 108, and/or L3 cache 110) include mechanisms for adjusting a supply voltage for the cache. For example, in some embodiments, the supply voltage for the memory circuits may be lowered to reduce the amount of electrical power consumed by the memory circuits in the cache. In some of these embodiments, it is possible to lower the supply voltage to a voltage that is low enough to cause low-voltage faults, i.e., to cause the memory circuits to output unexpected or undesired values due to the reduced noise margin caused by the lowered supply voltage (such faults are permanent at a given supply voltage-frequency-temperature combination). To avoid using erroneous data caused by low-voltage faults, which are interchangeably called bit errors, the described embodiments use the history record to determine an error protection method that is used for portions of the cache, and may disable portions of the cache with more than a specified number of bit errors.

The mechanisms and operations herein described are not limited to protecting against low-voltage faults. Other faults that affect accesses to memory elements in a data array in a cache, such as failed circuit elements, process faults, thermal faults, etc.—i.e., that cause the memory elements to experience permanent/repeated faults given particular operating conditions—can be avoided using the mechanisms and operations herein described. These faults may also be called bit errors.

Initializing or Resetting History Records

In some embodiments, a cache controller (e.g., cache controller 210) and/or another entity in computing device 100 initializes or resets the history records associated with some or all of the portions 204 in a cache (e.g., L1 cache 106, L2 cache 108, etc.). For example, the cache controller may initialize or reset the history records at startup, when lowering voltages or other operating parameters for the cache, when switching operating modes, when executing a new software program, etc. When initializing or resetting history records, the cache controller sets the history records to a value that indicates that an unknown number of bit errors is present in the portion. For example, assuming a two-bit history record, the cache controller may set the history record to 01. In this way, the cache controller performs operations so that each portion of the cache is protected in specified ways (see, e.g., FIG. 8) until the cache controller and/or another entity determines the actual number of bit errors in the portions of the cache.

Figure 6:
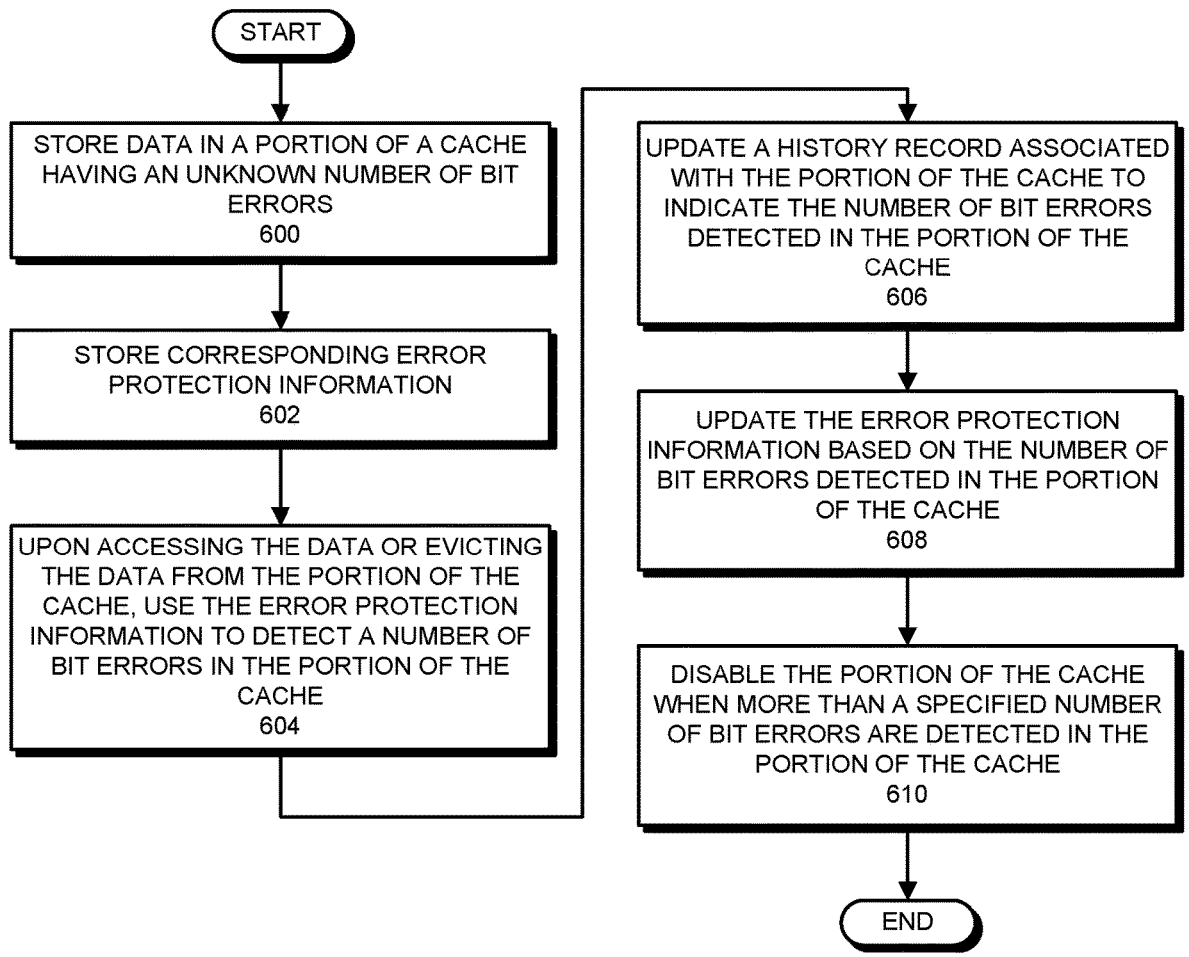
FIG. 6 presents a flowchart illustrating a process for checking for bit errors and updating a history record in accordance with some embodiments.

Updating a History Record to Indicate Bit Errors Detected in a Portion of a Cache As described above, history records, which indicate bit errors previously detected in portions of a cache, are used along with coherency states of data to determine error protections to be used for portions of a cache. FIG. 6 presents a flowchart illustrating a process for checking for bit errors and updating a history record in accordance with some embodiments. Note that the operations shown in FIG. 6 are presented as a general example of functions performed by some embodiments. The operations performed by other embodiments include different operations and/or operations that are performed in a different order. Additionally, although certain mechanisms are used in describing the process, in some embodiments, other mechanisms perform the operations.

The operations shown in FIG. 6 start when a cache controller (e.g., cache controller 210) stores data in a portion of the cache having an unknown number of bit errors (step 600). For this operation, the cache controller stores the data in a portion of the cache that has not had data stored thereto since the history record (e.g., history record 406) in a corresponding entry in the tag array (e.g., tag array 206) was initialized or reset, e.g., after a startup, a change in an operating parameter such as voltage, etc. The history record therefore includes a value (e.g., 01 or another value) that indicates that an unknown number of bit errors are present in the portion of the cache.

Although not shown, for the example in FIG. 6, it is assumed that the data is in a coherency state in which the data may not be modified, such as a shared or read-only coherency state. In other words, the data is "clean" and thus matches other copies stored in lower-level caches and/or memory. In some embodiments, data in coherency states in which the data may be modified is preferentially not stored in a portion of the cache with an unknown number of errors. These embodiments avoid storing such data in portions of the cache with unknown numbers of bit errors because modified or "dirty" data held in such portions may be the only current and correct copy of data in the computing device. When the only current and correct copy of data in the computing device is corrupted due to an uncorrectable number of bit errors, the computing device can experience a silent data corruption error or crash. When it is unavoidable to store data in a coherency state in which the data may be modified in a portion of the cache with an unknown number of errors (e.g., due to replacement policies for other portions of the cache, due to multi-bit bit errors in other portions of the cache, etc.), the error protection is extended to force one or more copies of the data, when modified, to be immediately stored in a lower-level cache or memory. In other words, modified data in the portion of the cache with the unknown number of errors is handled in a write-through mode. Note, however, that portions of the cache that do not meet these conditions (i.e., unknown number of bit errors and modifiable data) are handled in the write back mode as.

The cache controller also stores corresponding error protection information (step 602). Because the unknown number of errors is present in the portion of the cache, the cache controller uses an error protection for the portion of the cache that is sufficient to both detect multi-bit bit errors and correct single-bit bit errors. For example, in some embodiments, the cache controller uses a combination of a parity check and SECDED error correction to detect bit errors and correct single-bit bit errors. In some of these embodiments, e.g., in embodiments in which 64-byte portions are used, the parity check relies on sixteen parity check bits and the SECDED error correction relies on an eleven-bit error correction code. For operation 602 in these embodiments, the cache controller generates (or otherwise receives, e.g., from a core 102, etc.), based on the data, the parity check bits and the error correction code and stores the parity check bits and the error correction code for future use. For example, in some embodiments, the cache controller stores four of the parity check bits in the portion of the cache and a further twelve parity check bits in an error protection field (e.g., error protection 502) in an entry in an error protection cache (e.g., error protection cache 208), and stores the error correction code in other bits of the entry in the error protection cache.

The cache controller next, upon accessing (reading, etc.) or evicting the data in/from the portion of the cache, uses the stored error protection information to detect a number of bit errors in the portion of the cache (step 604). During this operation, the cache controller performs a segmented and interleaved parity check using the sixteen parity check bits and performs the SECDED error correction check, e.g., by using dedicated or purpose-specific processing circuits or executing program code such as firmware in general purpose processing circuits. At the conclusion of the operation, the number of bit errors in the portion of the cache is known—and a single-bit bit error in the data from the portion may be corrected.

The cache controller then updates a history record associated with the portion of the cache to indicate the number of bit errors detected in the portion of the cache (step 606). During this operation, the cache controller updates the history record in an entry in the tag array associated with the portion of the cache to indicate the number of bit errors. For example, when a two-bit value is used to indicate bit errors, the cache controller sets the two-bit value to indicate the number of errors. For instance, a value of 00 may indicate no errors, a value of 10 may indicate one bit error, and a value of 11 may indicate multi-bit bit errors. The history record is subsequently used to assist in determining an error protection to be used for the portion of the cache.

In some embodiments, the cache controller also updates the error protection information for the portion of the cache based on the number of bit errors detected in the portion of the cache (step 608). During this operation, the cache controller updates the error protection information in one or both of the error protection cache and the portion based on the error protection that is to be used for protecting the portion of the cache given the detected number of bit errors. For example, when no bit errors are detected in the portion of the cache, the cache controller may clear error protection information (e.g., parity bits and/or error correction code values) from the error protection cache, update parity information in the portion of the cache, etc., depending on the particular type of error protection that is used for protecting portions that are not known to include bit errors.

In some embodiments, the cache controller also disables the portion of the cache when more than a specified number of bit errors are detected in the portion of the cache (step 610). In some embodiments, due to constraints on the size of the entries in the error protection cache, only certain error correction code checks can be used for protecting the portion of the cache from bit errors, and thus multi-bit bit errors cannot be corrected. In order to avoid a multi-bit bit error corrupting data that is stored in the portion of the cache, therefore, the portion of the cache is disabled—and thus is (at least temporarily) no longer used for storing data. For example, in some embodiments, a replacement policy used by the cache is set so that any portion of the cache with a history record that indicates a multi-bit bit error is not selected or otherwise allocated for storing data. In these embodiments, the portion of the cache is "disabled" by not being selected for storing data, although the corresponding memory circuits may remain electrically powered and available for other operations. As another example, in some embodiments, the cache sets a disabled bit in the corresponding location in the tag array so that no tag is permitted to be stored in the corresponding location in the tag array, sets a disabled bit in the portion of the cache, adds an identifier for the portion of the cache to a disabled list, and/or performs other operations to ensure that the portion of the cache is not subsequently used for storing data. Note, however, that other embodiments may not disable portions of the cache with less than a specified number of bit errors—as controlled by the particular error correction code mode in use. Generally, portions of the cache are disabled in order to avoid storing data in portions of the cache for which bit errors cannot be corrected. In addition, upon detecting a multi-bit bit error in the portion of the cache, a fresh copy of the data may be reloaded from a lower-level cache or memory and stored in another portion of the cache.

In some embodiments, at least steps 606 and 608 are performed in parallel, so that the history record is updated and the portion of the cache is disabled at substantially the same time (i.e., within a short time of one another or at the same time). This avoids the situation where the history record and the portion of the cache are not in agreement for a period of time—and avoids potential errors associated with such a disagreement (i.e., accesses of data in portions of the cache that should have been disabled, use of an incorrect error protection, etc.).

Selecting and Using an Error Protection for a Portion of a Cache

Figure 7:
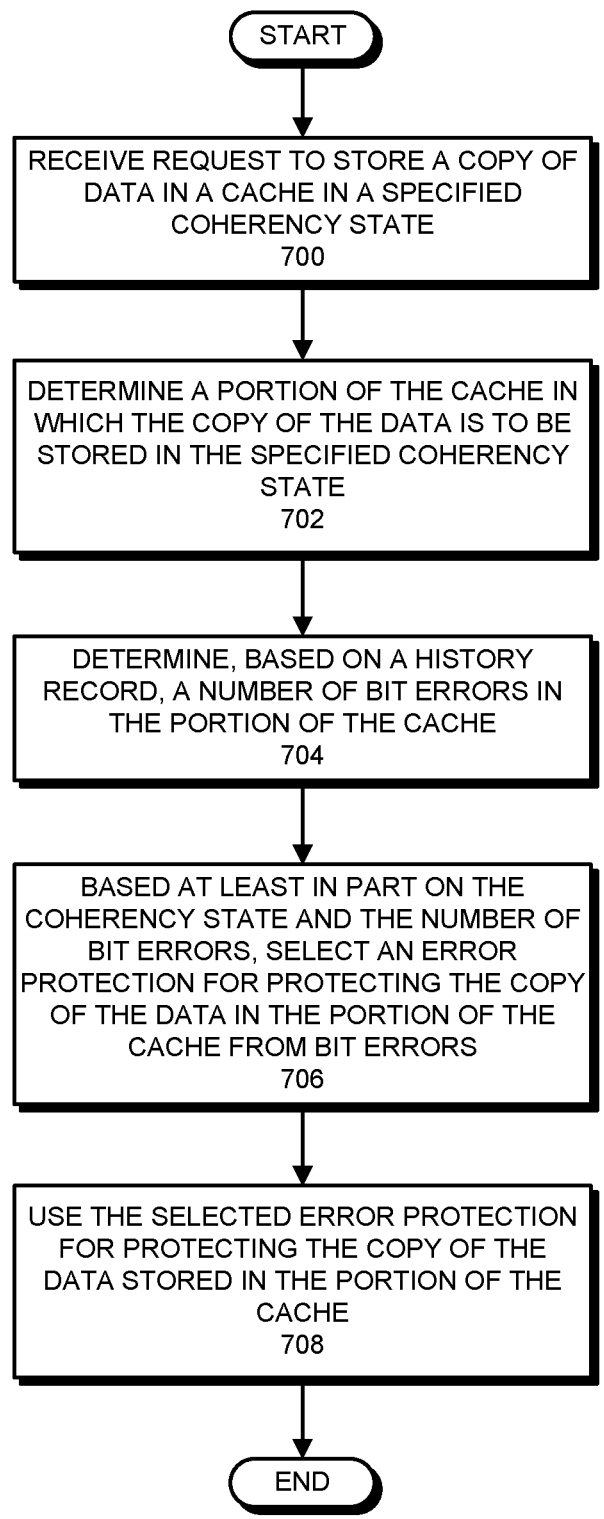
FIG. 7 presents a flowchart illustrating a process for selecting an error protection to be used for protecting data in a portion of a cache in accordance with some embodiments.

In the described embodiments, an error protection to be used for protecting data in a portion of a cache is selected based on a number of bit errors in the portion of the cache and the coherency state of data to be stored in the portion of the cache. FIG. 7 presents a flowchart illustrating a process for selecting an error protection to be used for protecting data in a portion of a cache in accordance with some embodiments. Note that the operations shown in FIG. 7 are presented as a general example of functions performed by some embodiments. The operations performed by other embodiments include different operations and/or operations that are performed in a different order. Additionally, although certain mechanisms are used in describing the process, in some embodiments, other mechanisms perform the operations.

For the operations in FIG. 7, it is assumed that a history record associated with the portion of the cache in which a copy of data is to be stored has already been updated to indicate a number of bit errors that was previously detected. For example, the operations in FIG. 6 may have been performed. For the example in FIG. 7, it is also assumed that the portion of the cache has no bit errors or has one bit error, and thus is still permitted to be used for storing copies of data (i.e., is not disabled, as is done for portions of the cache with multi-bit bit errors).

The process shown in FIG. 7 starts when a cache controller (e.g., cache controller 210) receives, from a requesting entity (e.g., a core 102), a request to store a copy of data in the cache in a specified coherency state (step 700). For example, an entity may request that the copy of data be stored in the cache in a coherency state in which the data may not be modified (e.g., read-only, shared, etc.) so that the entity may read some or all of the data, i.e., may perform read-only accesses of the data. As another example, an entity may request that the copy of data be stored in the cache in a coherency state in which the data may be modified (e.g., modified, etc.) so that the entity may read or write some or all of the data, i.e., may perform either read or write accesses of the data.

Although FIG. 7 describes operations for storing data in the cache, in some embodiments, other changes in the coherency state cause similar operations to be performed. For example, the coherency state of data that is already stored in a portion of the cache may be changed from non-modifiable (read-only) to modifiable (read-write), etc. Generally, in the described embodiments, based on a present coherency state of the data in portions of the cache (and history records), error protections are selected and used.

The cache controller then determines a portion of the cache in which the copy of the data is to be stored in the specified coherency state (step 702). During this operation, the cache controller uses an address and/or other information about the copy of the data to determine, based on a replacement policy or other rules or guidelines, the portion of the cache. After this operation, the cache controller has identified the particular portion (e.g., set, way, physical location, etc.) in the cache in which the data is to be stored.

The cache controller then determines, based on the history record in a corresponding entry in the tag array, a number of bit errors in the portion of the cache memory (step 704). During this operation, the cache controller reads a value from the history record associated with the portion of the cache memory and determines, using one or more logical, mathematical, or other operations, whether the portion has no bit errors or a single bit error. For example, when the history record is a two-bit value, the cache controller can determine whether the value is 00 or 10, which indicates that the portion of the cache had no bit error or a single-bit bit error, respectively.

Based at least in part on the coherency state and the number of bit errors, the cache controller then selects an error protection from among a plurality of error protections to be used for protecting the copy of the data in the portion of the cache from bit errors (step 706). During this operation, the cache controller selects from among a plurality of error protections, each error protection including a variation and/or combination of parity checks and/or error correction codes, a particular error protection so that the data in the portion is protected from the effects of bit errors given the coherency state and the number of bit errors in the portion. In other words, the cache controller selects an error protection that provides sufficient coverage to avoid corruption of the data due to bit errors, in view of the availability of current and correct copies of the data in lower-level caches or memory and/or the ability to recover data (including modified data) using an error correction code.

FIG. 8 presents a table illustrating error protections that are selected based on a number of bit errors in a portion of the cache and a coherency state of data stored in the portion of the cache in accordance with some embodiments. Note that the table shown in FIG. 8 is presented as a general example of error protections that may be selected in some embodiments. The error protections selected in other embodiments include error protections that include different combinations or types of parity checks and error correction code checks. For example, in some embodiments, different numbers of parity bits and/or different types of error correction code checks may be used.

As can be seen in the first entry of the table in FIG. 8, when the history record indicates that no bit errors were detected and the data stored in the portion of the cache is in a coherency state ("C-STATE") in which the data may not be modified (or the data is known to be "CLEAN"), the error protection that is selected is a four bit parity check. In other words, there is no error correction code check performed for this combination of bit errors and coherency state, only the parity check. This is true because the portion of the cache is known not to have permanent/repeating bit errors due to effects such as a present operating voltage, and thus will not require an error correction code check to fix a bit error. Also, because the data is "clean" and may not be modified, a copy of the data in a lower-level cache or memory is current and correct—and thus may be used to replace the data stored in the portion of the cache if the parity check discovers one or more bit errors (e.g., transient bit errors).

As can be seen in the second entry of the table in FIG. 8, when the history record indicates that no bit errors were detected and the data stored in the portion of the cache is in a coherency state ("C-STATE") in which the data may be modified (or the data is considered to be "DIRTY"), the error protection that is selected is a combination of a four bit parity check and an eleven bit SECDED error correction code check (a 64-byte portion size is assumed for the example). In other words, for this combination of bit errors and coherency state, both a parity check and an error correction code check are performed. This is true because the portion of the cache is known not to have permanent/repeating bit errors due to effects such as a present operating voltage, but the data may be modified, and thus may be the only current and correct copy of the data in the computing device. The error protection therefore enables the correction of a single-bit bit error such as a transient bit error (e.g., cosmic ray fault, etc.)—and the detection of multi-bit bit errors.

The remaining entries in the table in FIG. 8 show that, for the various combinations of detected bit errors and coherency states, error protections are selected to enable the detection and/or recovery of data stored in portions of the cache based on expected/known bit errors and unexpected bit errors such as transient errors. As described above, when multi-bit bit errors are discovered in portions of the cache, the portions are disabled. In addition, when an unknown number of bit errors is present in portions, the cache controller avoids storing modifiable data in the portions—or, when storing data in such portions is unavoidable, sets the individual portions as write-through, so that a current and correct copy of the data in such a portion is also stored in a lower-level cache and/or memory in the computing device.

Returning to FIG. 7, the cache controller then uses the selected error protection for protecting the copy of the data in the portion of the cache (step 708). Generally, during this operation, the cache controller uses the selected error protection to detect bit and/or correct expected and unexpected bit errors in the copy of the data in the portion of the cache. A number of examples of using a selected error protection to protect copies of data in portions of the cache are described below for FIGS. 9-12B.

Although not shown in FIG. 7, the cache controller (or another entity) may also perform operations for or relating to storing the copy of the data in the portion of the cache. For example, the cache controller may acquire, from a lower-level cache or memory, some or all of one or more cache lines that include the data and store, in the portion of the cache, the copy of the data in the specified coherency state. The cache controller may also cause other caches to invalidate/write back modified copies of the one or more cache lines and/or perform other coherency-related operations to ensure that the copy of the data is properly held in the portion of the cache in the coherency state. The cache controller may further update an entry in a tag array (e.g., tag array 206) associated with the portion of the cache to indicate that the data is stored in the portion in the coherency state and/or may perform other operations to record the presence and properties of the copy of the data in the portion of the cache.

As described herein, error protection information (e.g., a SECDED error correction code, parity check bits, etc.) may be stored in the error protection cache upon detecting bit errors in portions of the cache, storing data in a given coherency state in portions of the cache, changing coherency states of data stored in portions of the cache, etc. Recall that the error protection cache has fewer entries than there are portions in the cache. In some embodiments, therefore, when storing error protection information in the error protection cache, when there is no free/available entry in the error protection cache, existing error protection information is chosen for eviction from a selected location in accordance with a replacement policy for the error protection cache to free space for storing the new error protection information.

For example, in some embodiments, a least recently used policy is the replacement policy. In some embodiments, when existing error protection information is evicted from the error protection code cache, the data in a corresponding portion of the cache is also evicted (or otherwise invalidated). In other words, the data in the portion of the cache that was protected by the evicted error protection information is also evicted from the cache before or as the error protection information is evicted from the error protection cache (because the error protection information may still need to be used to protect the evicted data). This is done because the error protection information that protected the data in the corresponding portion of the cache has been evicted and there is no protection for the data in the corresponding portion of the cache. In addition, evicting the data from the corresponding portion of the cache frees the corresponding portion of the cache to store other data.

Figure 9:
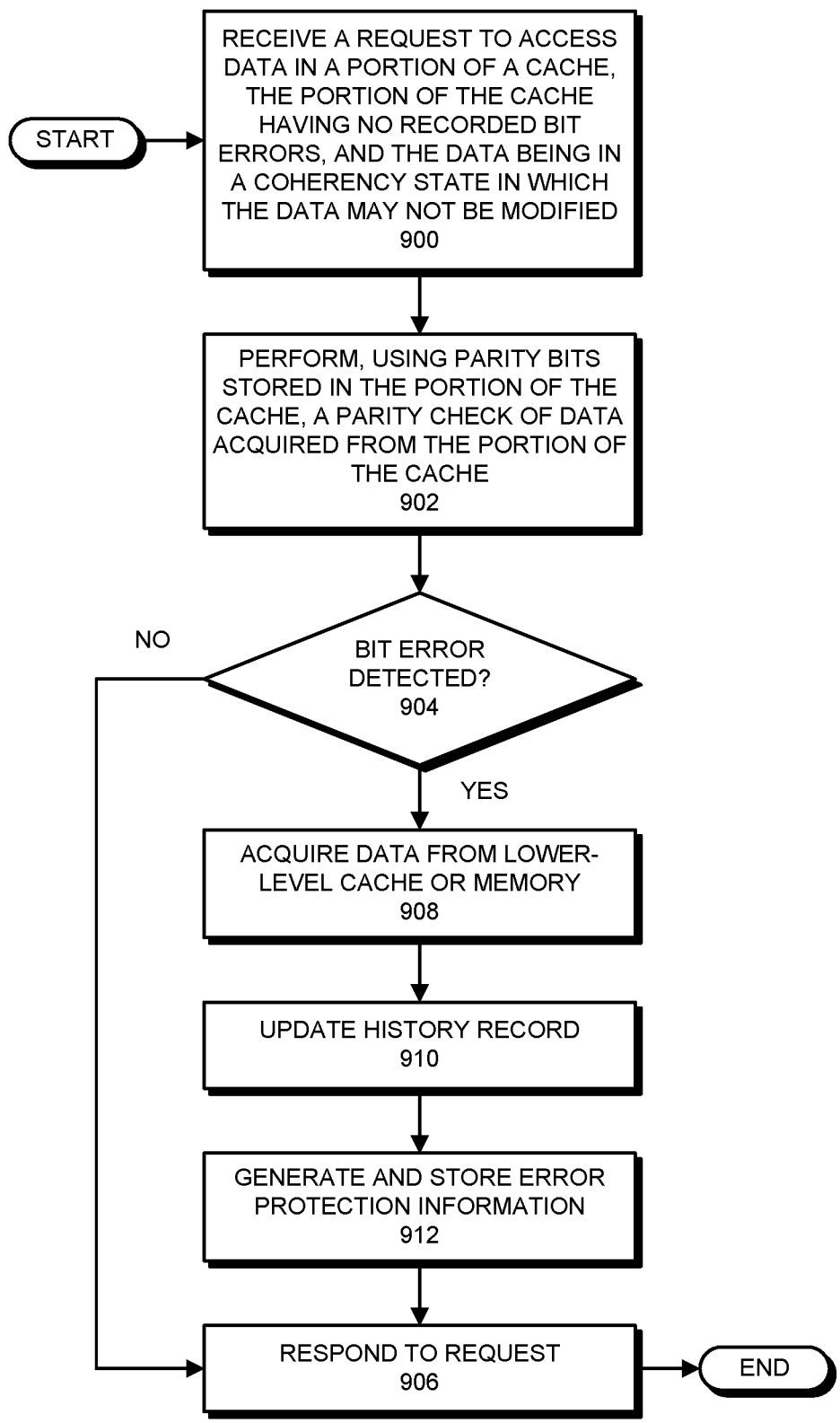
FIG. 9 presents a flowchart illustrating using an error protection to protect a portion of a cache that has no recorded bit errors when data in a coherency state in which the data may not be modified is stored in the portion of the cache in accordance with some embodiments.
Figure 10:
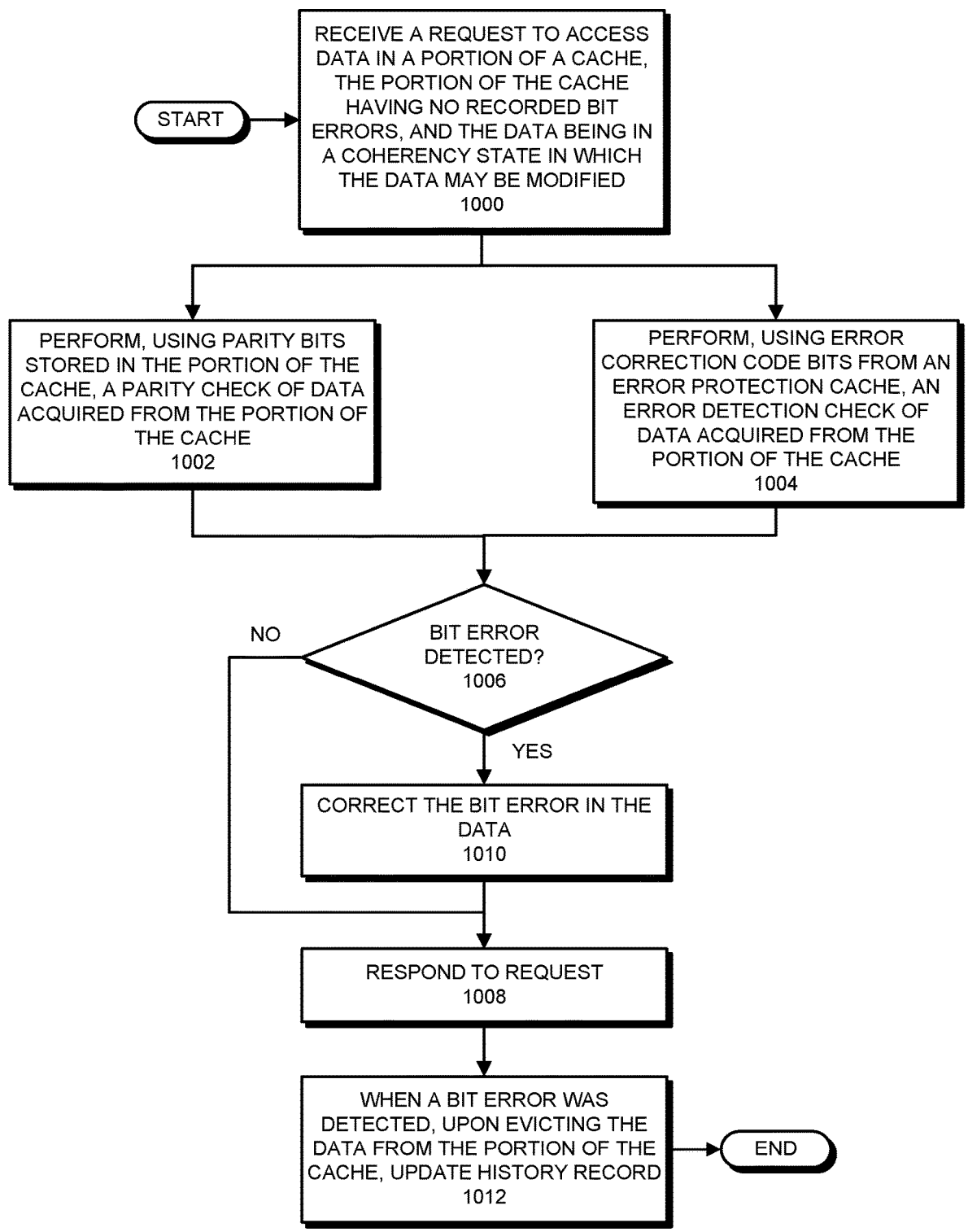
FIG. 10 presents a flowchart illustrating using an error protection to protect a portion of a cache that has no recorded bit errors when data in a coherency state in which the data may be modified is stored in the portion of the cache in accordance with some embodiments.

Using an Error Protection to Protect Data in a Portion of a Cache Having No Recorded Bit Errors In the described embodiments, different error protections are used for protecting a portion of a cache that is recorded as having no bit errors based on the coherency state (i.e., non-modifiable or modifiable) of data to be stored in the portion of the cache. FIG. 9 presents a flowchart illustrating using an error protection to protect a portion of a cache that has no recorded bit errors when data in a coherency state in which the data may not be modified (data that is known to be "clean") is stored in the portion of the cache in accordance with some embodiments. FIG. 10 presents a flowchart illustrating using an error protection to protect a portion of a cache that has no recorded bit errors when data in a coherency state in which the data may be modified (data which may be "dirty") is stored in the portion of the cache in accordance with some embodiments. Note that the operations shown in FIGS. 9-10 are presented as general examples of functions performed by some embodiments. The operations performed by other embodiments include different operations and/or operations that are performed in a different order. Additionally, although certain mechanisms are used in describing the processes, in some embodiments, other mechanisms perform the operations.

For the operations in FIGS. 9-10, it is assumed that a history record associated with the portion of the cache in which a copy of data is to be stored has already been updated to indicate a number of bit errors that was previously detected. For example, the operations in FIG. 6 may have been performed. In addition, the error protection has been selected and is being used to protect the portion of the cache. For example, the operations of FIG. 7 may have been performed.

The operations in FIG. 9 start when a cache controller receives a request to access data in a portion of the cache, the portion of the cache having no recorded bit errors, and the data being in a coherency state in which the data may not be modified (step 900). For this operation, the cache controller receives a request to provide the data to a requesting entity and thus should ensure that the data does not include a new bit error before providing the data. The cache controller therefore performs, using parity bits (e.g., four parity bits) stored in the portion of the cache, a parity check of data acquired from the portion of the cache (step 902). As shown in the table in FIG. 8, the parity check is the only check that is performed for the combination of no bit errors and clean data, and the check is to detect if any new bit errors have occurred (e.g., a transient bit error).

When the parity check does not discover a bit error (step 904), the cache controller responds to the request with the acquired data (step 906). Otherwise, when the parity check discovers a bit error (step 904), the cache controller acquires a correct and current copy of data from a lower-level cache or memory (step 908). The cache controller also updates the history record to indicate the bit error (step 910), generates and stores error protection information for the data (step 912), and responds to the request with the acquired data (step 906). For example, the cache controller may generate corresponding error protection information based on the coherency state of the data (i.e., a coherency state in which the data may not be modified) and store a copy of the data acquired from the lower-level cache or memory into the portion of the cache.

The operations in FIG. 10 start when a cache controller receives a request to access data in a portion of the cache, the portion of the cache having no recorded bit errors, and the data being in a coherency state in which the data may be modified (step 1000). For this operation, the cache controller receives a request to provide the data to a requesting entity and thus should ensure that the data does not include bit errors before providing the data. The cache controller therefore performs, using parity bits (e.g., four parity bits) stored in the portion of the cache, a parity check of data acquired from the portion of the cache (step 1002). The cache controller also performs, using error correction code bits (e.g., eleven error correction code bits) from an error protection cache, a SECDED error detection check of data acquired from the portion of the cache (step 1004). As shown in the table in FIG. 8, both a parity check and a SECDED error detection check are performed for the combination of no bit errors and dirty data, as the copy of the data is the only current copy of the data available in the computing device (recall that the cache is operated in a write-back mode), so, although there is no expected bit error (e.g., due to an operating voltage, etc.), another bit error (e.g., a transient bit error) must be detectable and correctable.

When no bit error is discovered by the parity check or the error detection check (step 1006), the cache controller responds to the request with the acquired data (step 1008). Otherwise, when the parity check and the error detection check discover a bit error (step 1006), the cache controller corrects the bit error in the data using the SECDED error correction code bits (step 1010) and then responds to the request with the acquired data (step 1008). In some embodiments, upon detecting a bit error (step 1006), the cache controller does not immediately update the history record to indicate that the bit error was encountered, but instead waits until the data is evicted from the portion of the cache and then updates the history record to indicate the number of bit errors (step 1012). The cache controller will then subsequently generate and store error protection information for data when (and if) data is next stored in the portion of the cache. In these embodiments, this is possible because the existing error protection information enables the correction of the bit error in the data. In some embodiments, when the error correction code check and the parity check disagree with respect to the number of bit errors detected/present in the portion of the cache (e.g., the parity check discovers a bit error, but the error detection check does not), the bit error can be corrected using the SECDED error correction code bits and the portion of the cache disabled.

Figure 11A:
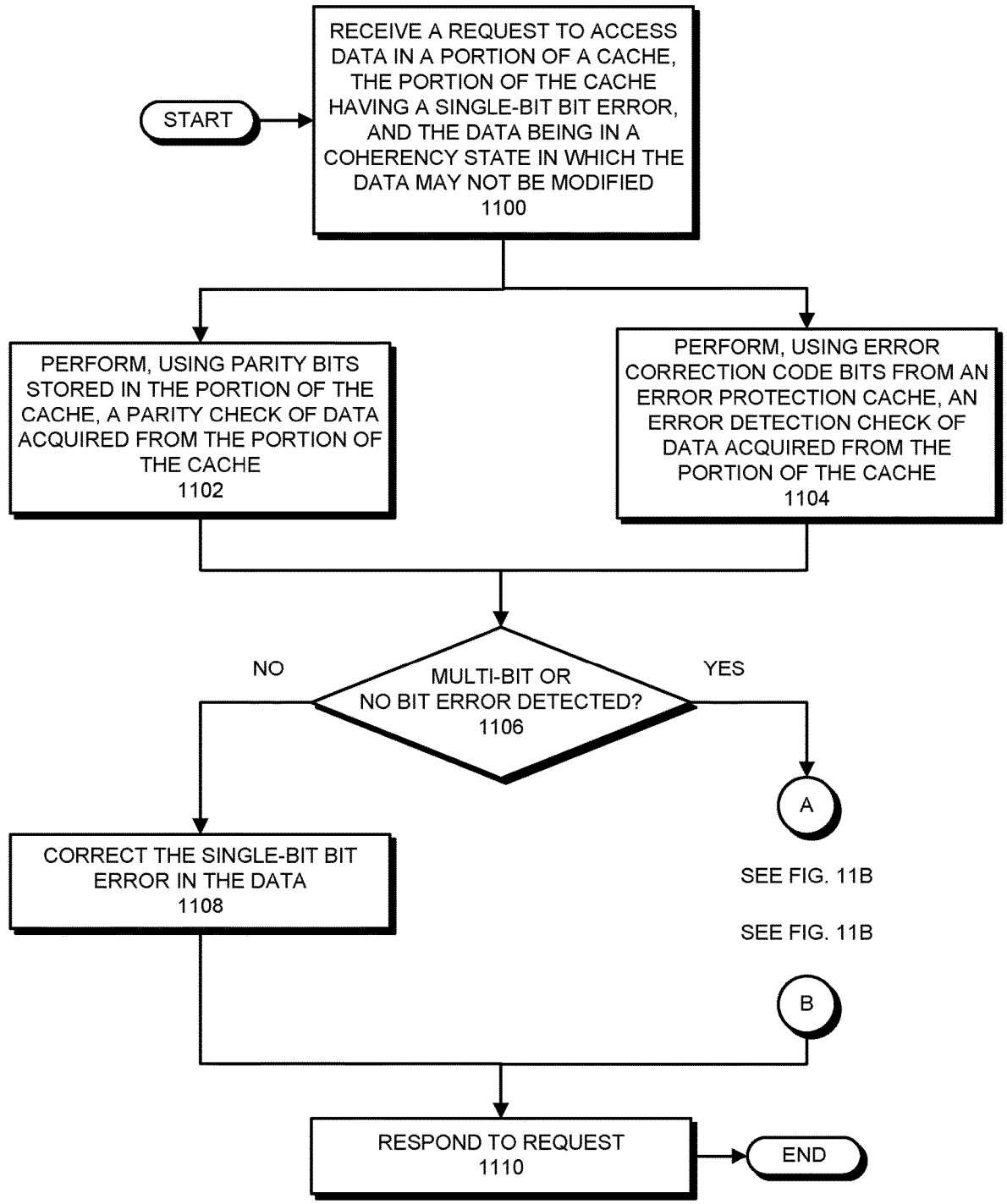
FIGS. 11A-11B present a flowchart illustrating using an error protection to protect a portion of a cache that has a single-bit bit error when data in a coherency state in which the data may not be modified is stored in the portion of the cache in accordance with some embodiments.
Figure 11B:
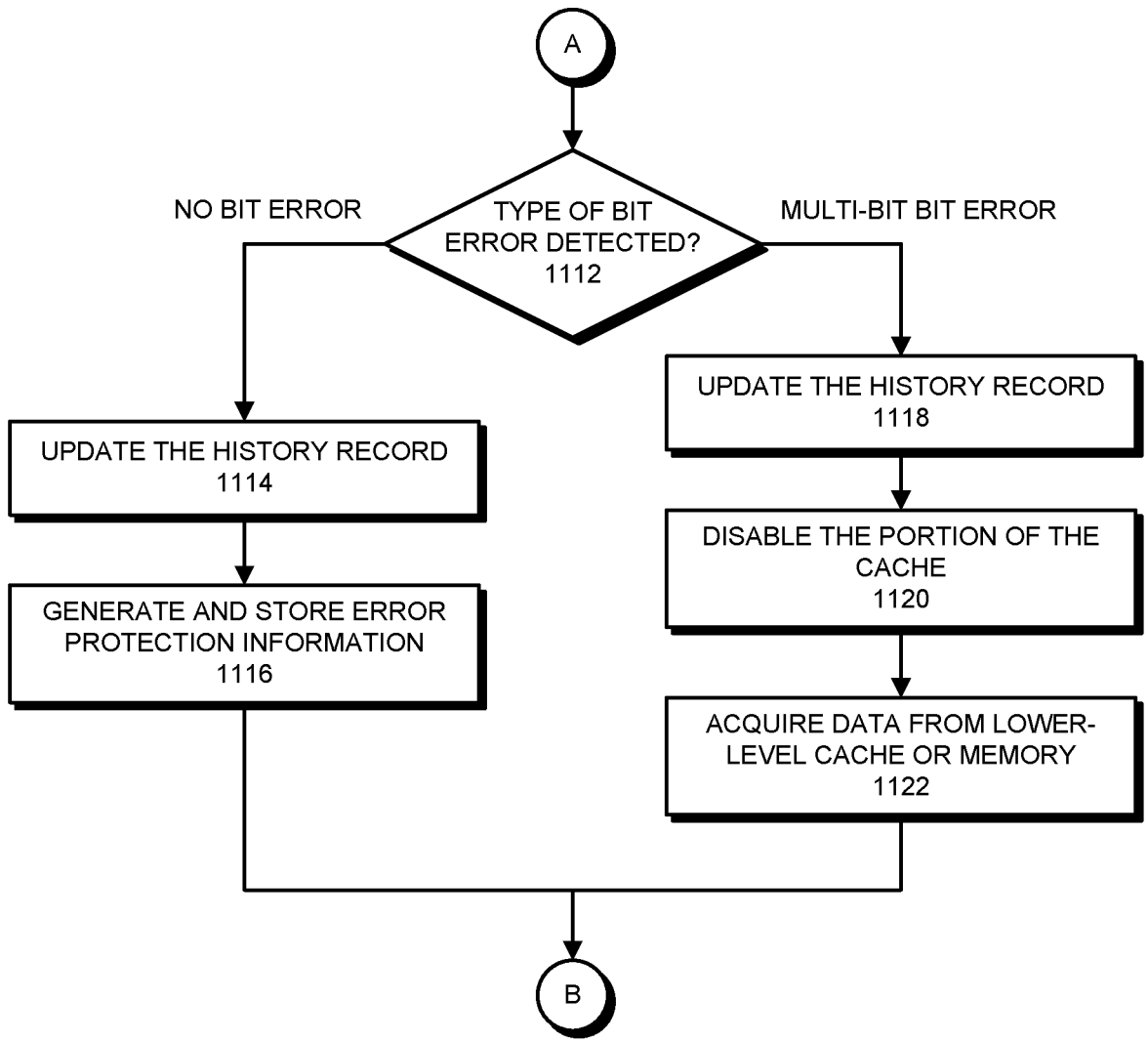
Figure 12A:
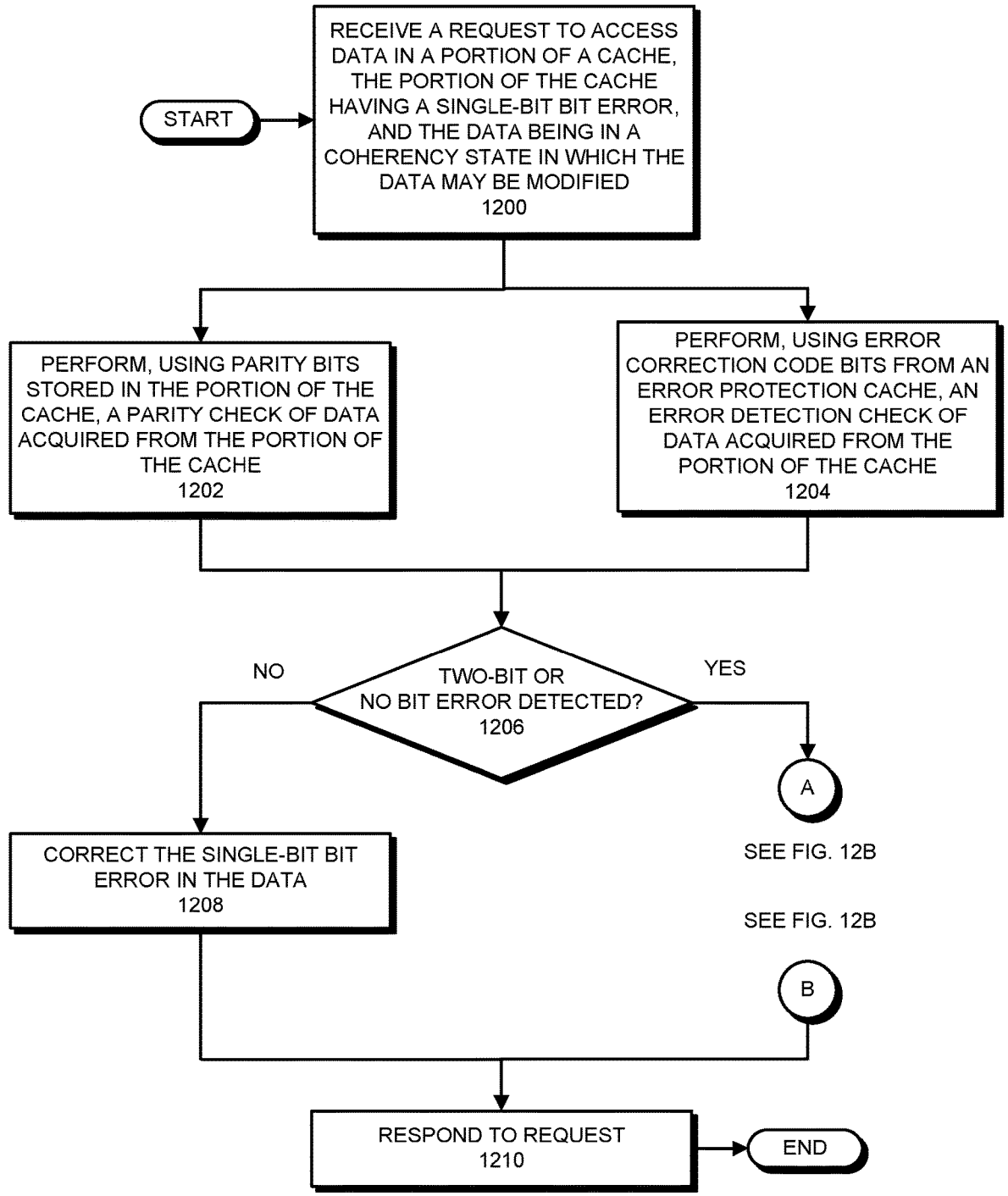
FIGS. 12A-12B present a flowchart illustrating using an error protection to protect a portion of a cache that has a single-bit bit error when data in a coherency state in which the data may be modified is stored in the portion of the cache in accordance with some embodiments.
Figure 12B:
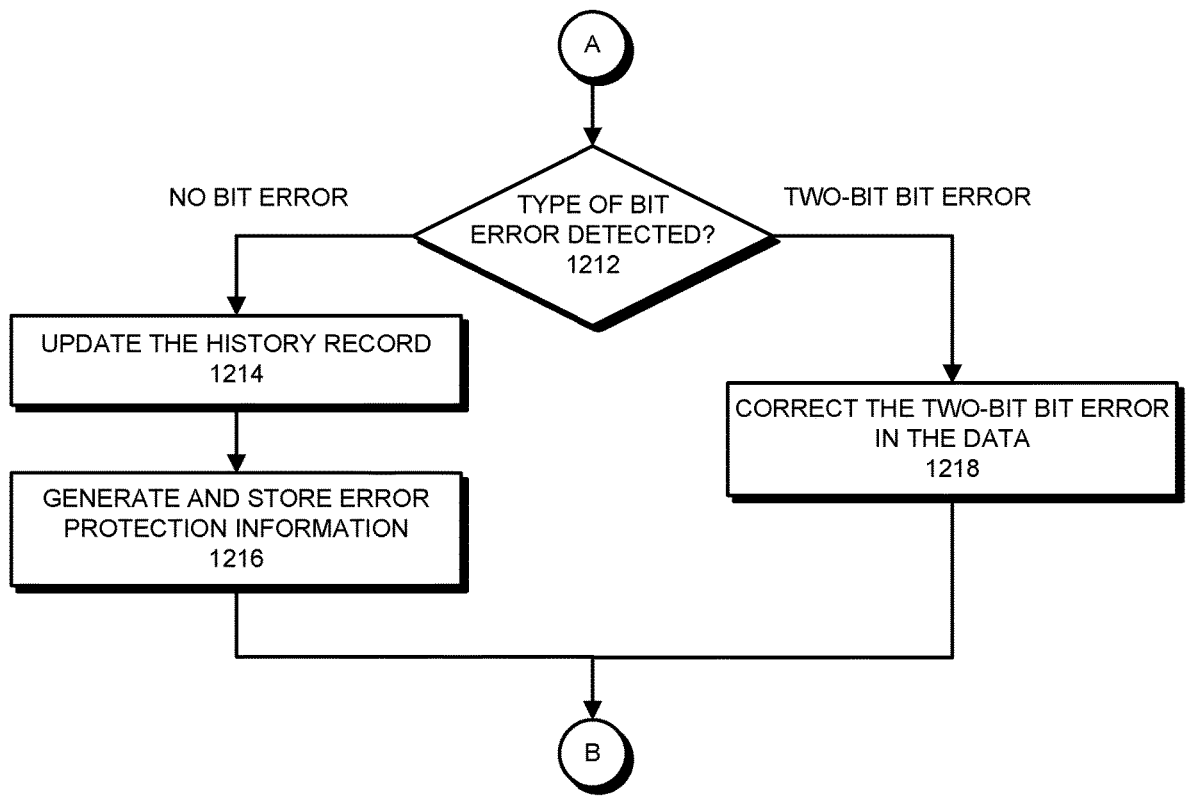

Using an Error Protection to Protect Data in a Portion of a Cache Having a Single-Bit Bit Error In the described embodiments, different error protections are used for protecting a portion of a cache that is recorded as having a single-bit bit error based on the coherency state (i.e., non-modifiable or modifiable) of data to be stored in the portion of the cache. FIGS. 11A-11B present a flowchart illustrating using an error protection to protect a portion of a cache that has a single-bit bit error when data in a coherency state in which the data may not be modified (data that is known to be "clean") is stored in the portion of the cache in accordance with some embodiments. FIGS. 12A-12B present a flowchart illustrating using an error protection to protect a portion of a cache that has a single-bit bit error when data in a coherency state in which the data may be modified (data that is considered to be "dirty") is stored in the portion of the cache in accordance with some embodiments. Note that the operations shown in FIGS. 11A-11B and 12A-12B are presented as general examples of functions performed by some embodiments. The operations performed by other embodiments include different operations and/or operations that are performed in a different order. Additionally, although certain mechanisms are used in describing the processes, in some embodiments, other mechanisms perform the operations.

For the operations in FIGS. 11A-11B and 12A-12B, it is assumed that a history record associated with the portion of the cache in which a copy of data is to be stored has already been updated to indicate a number of bit errors that was previously detected. For example, the operations in FIG. 6 may have been performed. In addition, the error protection has been selected and is being used to protect the portion of the cache. For example, the operations of FIG. 7 may have been performed.

The operations in FIGS. 11A-11B start when a cache controller receives a request to access data in a portion of the cache, the portion of the cache being recorded as having a single-bit bit error, and the data being in a coherency state in which the data may not be modified (step 1100). For this operation, the cache controller receives a request to provide the data to a requesting entity and thus should ensure that the data does not include either the known bit error or an unexpected bit error before providing the data. The cache controller therefore performs, using parity bits (e.g., four parity bits) stored in the portion of the cache, a parity check of the data (step 1102). The cache controller also performs, using error correction code bits (e.g., eleven error correction code bits) from an error protection cache, a SECDED error detection check of the data in the portion of the cache (step 1104). As shown in the table in FIG. 8, both a parity check and a SECDED error correction code check are performed for the combination of a single-bit bit error and clean data, as the copy of the data is known to have at least the single-bit bit error, and may have another bit error due to transient errors, etc. The known/existing single-bit bit error is therefore correctable, and the data, which is clean, can be reacquired from a lower-level cache or memory in the event that an unexpected bit error is encountered.

When the single-bit (and expected) bit error is discovered by the parity check and the error detection check (step 1106), the cache controller corrects the single-bit bit error using the error correction code (step 1108) and responds to the request (step 1110). When the parity check and the error detection check discover no bit error (step 1106/1112), as may happen when the previously-detected bit error was a transient bit error, the cache controller updates the history record to indicate the number of bit errors (step 1114), generates and stores error protection information for the data (step 1116), and responds to the request with the data (step 1110). In some embodiments, generating and storing the error protection information in this situation includes freeing an entry in the error protection cache that was being used to store SECDED error correction code information, as such information is not used for protecting portions of the cache with no bit errors and data in a coherency state in which the data cannot be modified (see FIG. 8). When the parity check or the error detection check discover a multi-bit bit error (step 1106/1112), the cache controller updates the history record to indicate the number of bit errors (step 1118), disables the portion of the cache (step 1120), acquires the data from a lower-level cache or memory (step 1122), and responds to the request with the acquired data (step 1110). The cache controller may also store the data acquired from the lower-level cache or memory in a different portion of the cache, etc. In some embodiments, when the error correction code check and the parity check disagree with respect to the number of bit errors detected/present in the portion of the cache, the bit error can be corrected or the data acquired from the lower-level cache or memory and the portion of the cache disabled.

The operations in FIGS. 12A-12B start when a cache controller receives a request to access data in a portion of the cache, the portion of the cache having a single-bit bit error, and the data being in a coherency state in which the data may be modified (step 1200). For this operation, the cache controller receives a request to provide the data to a requesting entity and thus should ensure that the data does not include either the known bit error or an unexpected bit error before providing the data. The cache controller therefore performs, using parity bits (e.g., four parity bits) stored in the portion of the cache, a parity check of the data (step 1202). The cache controller also performs, using error correction code bits (e.g., twenty one error correction code bits) from an error protection cache, a DECTED error detection check of the data in the portion of the cache (step 1204). As shown in the table in FIG. 8, both a parity check and a DECTED error detection check are performed for the combination of a single-bit bit error and dirty data, as the copy of the data is known to have at least the single-bit bit error and may have another and unexpected bit error due to transient errors, etc. Both the known/existing single-bit bit error and an unexpected bit error in the data, which is dirty (or is assumed to be dirty, given the modifiable coherency state) and is the only current and correct copy of the data, can be corrected using the DECTED error correction code check.

When the single-bit (and expected) bit error is discovered by the parity check and the error detection check (step 1206), the cache controller corrects the single-bit bit error using the error correction code (step 1208) and responds to the request (step 1210). When the parity check and the error detection check discover no bit error (step 1206/1212), as may happen when the previously-detected bit error was a transient bit error, the cache controller updates the history record to indicate the number of bit errors (step 1214), generates and stores error protection information for the data (step 1216), and responds to the request with the data (step 1210). When the parity check or the error detection check discover a two-bit bit error (step 1206/1212), the cache controller corrects the two-bit bit error using the error correction code (step 1218) and responds to the request (step 1210). In some embodiments, the cache controller performs one or more error handling operations when a three-bit or higher bit error is detected in the data (although this situation is not expected to occur). In some embodiments, when the error correction code check and the parity check disagree with respect to the number of bit errors detected/present in the portion of the cache, the bit error can be corrected (or error handling can be performed) and the portion of the cache disabled.

History Record Verification

In some embodiments, disabled portions of a cache can be re-enabled when it is determined that multi-bit errors detected in the portions were due at least in part to transient errors. In these embodiments, portions of the cache that are listed in the history records as having multi-bit bit errors are checked in order to verify that the portions of the cache still have multi-bit bit errors. For example, a cache controller can check such portions periodically, as a specified event or time occurs, based on a number of disabled portions, etc. and can restore portions that no longer have multi-bit errors to use. In these embodiments, the history record for each portion that is restored to use can be updated (to indicate a single-bit bit error or no bit error is present in that portion), a corresponding error protection can be selected and enabled (including generating and storing error protection information, etc.), and/or other operations can be performed to restore that portion to use.

In some embodiments, a computing device (e.g., computing device 100 in FIG. 1 and/or some portion thereof) uses code and/or data stored on a non-transitory computer-readable storage medium to perform some or all of the operations herein described. More specifically, the computing device reads the code and/or data from the computer-readable storage medium and executes the code and/or uses the data when performing the described operations.

A computer-readable storage medium can be any device or medium or combination thereof that stores code and/or data for use by a computing device. For example, the computer-readable storage medium can include, but is not limited to, volatile memory or non-volatile memory, including flash memory, random access memory (eDRAM, RAM, SRAM, DRAM, DDR, DDR2/DDR3/DDR4 SDRAM, etc.), read-only memory (ROM), and/or magnetic or optical storage mediums (e.g., disk drives, magnetic tape, CDs, DVDs).

In some embodiments, one or more hardware modules perform the operations herein described. For example, the hardware modules can include, but are not limited to, one or more processors/cores/central processing units (CPUs), application-specific integrated circuit (ASIC) chips, field-programmable gate arrays (FPGAs), caches/cache controllers, memory management units, compute units, embedded processors, graphics processors (GPUs)/graphics cores, pipelines, Accelerated Processing Units (APUs), cache controllers/caches, and/or other programmable-logic devices. When such hardware modules are activated, the hardware modules perform some or all of the operations. In some embodiments, the hardware modules include one or more general-purpose circuits that execute instructions (program code, firmware, etc.) to perform the operations.

In some embodiments, a data structure representative of some or all of the structures and mechanisms described herein (e.g., computing device 100 and/or some portion thereof) is stored on a non-transitory computer-readable storage medium that includes a database or other data structure which can be read by a computing device and used, directly or indirectly, to fabricate hardware including the structures and mechanisms. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates/circuit elements from a synthesis library that represent the functionality of the hardware including the above-described structures and mechanisms. The netlist may then be placed and routed to produce a data set describing geometric shapes to be applied to masks. The masks may then be used in various semiconductor fabrication steps to produce a semiconductor circuit or circuits corresponding to the above-described structures and mechanisms. Alternatively, the database on the computer accessible storage medium may be the netlist (with or without the synthesis library) or the data set, as desired, or Graphic Data System (GDS) II data.

In this description, functional blocks may be referred to in describing some embodiments. Generally, a functional block is a group, collection, and/or set of one or more interrelated circuit elements such as integrated circuit elements, discrete circuit elements, etc. The circuit elements are "interrelated" in that circuit elements share at least one property. For instance, the interrelated circuit elements may be included in, fabricated on, or otherwise coupled to a particular integrated circuit chip or portion thereof, may be involved in the performance of given functions (computational or processing functions, memory functions, etc.), may be controlled by a common control element, etc. A functional block can include any number of circuit elements, from a single circuit element (e.g., a single integrated circuit logic gate) to millions or billions of circuit elements (e.g., an integrated circuit memory), etc.

In this description, variables or unspecified values (i.e., general descriptions of values without particular instances of the values) are represented by letters such as N. As used herein, despite possibly using similar letters in different locations in this description, the variables and unspecified values in each case are not necessarily the same, i.e., there may be different variable amounts and values intended for some or all of the general variables and unspecified values. In other words, N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the system performs a first operation, a second operation, etc.," the system performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A method for operating a cache memory in a computing device, the cache memory being configured in a write-back mode, and the method comprising:
    acquiring, from a record of bit errors that are present in each of a plurality of portions of the cache memory, a number of bit errors in a portion of the cache memory;
    detecting a coherency state of data stored in the portion of the cache memory;
    based on the coherency state and the number of bit errors, selecting an error protection from among a plurality of error protections; and
    using the selected error protection to protect the data stored in the portion of the cache memory from errors.

2. The method of claim 1, wherein selecting the error protection comprises:
    when the portion of the cache memory is recorded as having no bit errors and the data is in a coherency state in which the data may not be modified, selecting an error protection for detecting an error in the data; and
    when at least one of the portion of the cache memory is recorded as having a bit error or the data is in a coherency state in which the data may be modified, selecting an error protection for both detecting an error in the data and correcting at least one error in the data.

3. The method of claim 2, wherein selecting the error protection comprises:
    when the portion of the cache memory is recorded as having no bit errors and the data is in a coherency state in which the data may not be modified, selecting a parity check as the error protection,
    wherein a specified number of parity bits that are stored in the portion of the cache memory are used for performing the parity check.

4. The method of claim 2, wherein selecting the error protection comprises:
    when the portion of the cache memory is recorded as having no bit errors and the data is in a coherency state in which the data may be modified, selecting, as the error protection, both a parity check and an error correction code (ECC) check that can correct one bit error,
    wherein a first specified number of parity bits that are stored in the portion of the cache memory are used for performing the parity check and a second specified number of ECC bits stored in an entry in an error protection cache separate from the cache memory are used for performing the ECC check.

5. The method of claim 2, wherein selecting the error protection comprises:
    when the portion of the cache memory is recorded as having one bit error and the data is in a coherency state in which the data may not be modified, selecting, as the error protection, both a parity check and an error correction code (ECC) check that can correct the one bit error,
    wherein a first specified number of parity bits that are stored in the portion of the cache memory are used for performing the parity check and a second specified number of ECC bits stored in an entry in an error protection cache separate from the cache memory are used for performing the ECC check.

6. The method of claim 2, wherein selecting the error protection comprises:
    when the portion of the cache memory is recorded as having one bit error and the data is in a coherency state in which the data may be modified, selecting, as the error protection, both a parity check and an error correction code (ECC) check that can correct at least two bit errors,
    wherein a first specified number of parity bits that are stored in the portion of the cache memory are used for performing the parity check and a second specified number of ECC bits stored in an entry in an error protection cache separate from the cache memory are used for performing the ECC check.

7. The method of claim 6, further comprising:
upon selecting, as the error protection, the ECC check that can correct at least two bit errors, transitioning a number of bits in the entry in the error protection cache from storing a number of parity bits to storing a portion of the second specified number of ECC bits.

8. The method of claim 2, wherein selecting the error protection comprises:
when the portion of the cache memory is recorded as having an unknown number of bit errors and the data is in a coherency state in which the data may not be modified, selecting, as the error protection, both a parity check and an error correction code (ECC) check that can correct at least one bit error,
wherein a first specified number of parity bits that are stored in the portion of the cache memory and a second specified number of parity bits that are stored in an entry in an error protection cache separate from the cache memory are used in combination for performing the parity check and a third specified number of ECC bits stored in the entry in the error protection cache are used for performing the ECC check.

9. The method of claim 2, further comprising:
when the portion of the cache memory is recorded as having an unknown number of bit errors, avoiding storing, in the portion of the cache memory, data in a coherency state in which the data may be modified, and
when storing the data in the portion of the cache memory is determined to be unavoidable, maintaining a current copy of the data in a lower-level cache or memory.

10. The method of claim 1, further comprising:
upon accessing data in the portion of the cache memory or evicting data from the portion of the cache memory, detecting, using one or more error detection mechanisms of the error protection, a number of bit errors in the portion of the cache memory; and
based on the number of bit errors, updating the record to include an indication of the number of bit errors in the portion of the cache memory.

11. The method of claim 10, further comprising, when a multi-bit bit error is detected in the portion of the cache memory, preventing the portion of the cache memory from being used for storing data.

12. The method of claim 1, further comprising:
reducing an operating voltage of the cache memory, the reduction of the operating voltage causing repeating bit errors to occur in at least some of the plurality of portions of the cache memory.

13. The method of claim 1, wherein:
some or all of the plurality of error protections rely on information that is stored in corresponding bits in an entry of an error protection cache,
the error protection cache has a number of entries that is smaller than a number of the plurality of portions in the cache memory, and
the entries in the error protection cache are dynamically associated with portions of the cache memory.

14. A computing device, comprising:
a cache memory, the cache memory being configured in a write-back mode; and
a cache controller functional block in the cache memory, the cache controller functional block configured to:
acquire, from a record of bit errors that are present in each of a plurality of portions of the cache memory, a number of bit errors in a portion of the cache memory;
detect a coherency state of data stored in the portion of the cache memory;
based on the coherency state and the number of bit errors, select an error protection from among a plurality of error protections; and
use the selected error protection to protect the data stored in the portion of the cache memory from errors.

15. The computing device of claim 14, wherein, when selecting the error protection, the cache controller functional block is configured to:
when the portion of the cache memory is recorded as having no bit errors and the data is in a coherency state in which the data may not be modified, select an error protection for detecting an error in the data; and
when at least one of the portion of the cache memory is recorded as having a bit error or the data is in a coherency state in which the data may be modified, select an error protection for both detecting an error in the data and correcting at least one error in the data.

16. The computing device of claim 15, wherein, when selecting the error protection, the cache controller functional block is configured to:
when the portion of the cache memory is recorded as having no bit errors and the data is in a coherency state in which the data may not be modified, select a parity check as the error protection
wherein a specified number of parity bits that are stored in the portion of the cache memory are used for performing the parity check.

17. The computing device of claim 15, wherein, when selecting the error protection, the cache controller functional block is configured to:
when the portion of the cache memory is recorded as having no bit errors and the data is in a coherency state in which the data may be modified, select, as the error protection, both a parity check and an error correction code (ECC) check that can correct one bit error,
wherein a first specified number of parity bits that are stored in the portion of the cache memory are used for performing the parity check and a second specified number of ECC bits stored in an entry in an error protection cache separate from the cache memory are used for performing the ECC check.

18. The computing device of claim 15, wherein, when selecting the error protection, the cache controller functional block is configured to:
when the portion of the cache memory is recorded as having one bit error and the data is in a coherency state in which the data may not be modified, select, as the error protection, both a parity check and an error correction code (ECC) check that can correct the one bit error,
wherein a first specified number of parity bits that are stored in the portion of the cache memory are used for performing the parity check and a second specified number of ECC bits stored in an entry in an error protection cache separate from the cache memory are used for performing the ECC check.

19. The computing device of claim 15, wherein, when selecting the error protection, the cache controller functional block is configured to:
when the portion of the cache memory is recorded as having one bit error and the data is in a coherency state in which the data may be modified, select, as the error protection, both a parity check and an error correction code (ECC) check that can correct two bit errors, wherein a first specified number of parity bits that are stored in the portion of the cache memory are used for performing the parity check and a second specified number of ECC bits stored in an entry in an error protection cache separate from the cache memory are used for performing the ECC check.

20. The computing device of claim 19, further comprising:
   upon selecting, as the error protection, the ECC check that can correct two bit errors, the cache controller is configured to transition a number of bits in the entry in the error protection cache from storing a number of parity bits to storing a portion of the second specified number of ECC bits.

21. The computing device of claim 15, wherein, when selecting the error protection, the cache controller functional block is configured to:
   when the portion of the cache memory is recorded as having an unknown number of bit errors and the data is in a coherency state in which the data may not be modified, select, as the error protection, both a parity check and an error correction code (ECC) check that can correct at least one bit error,
   wherein a first specified number of parity bits that are stored in the portion of the cache memory and a second specified number of parity bits that are stored in an entry in an error protection cache separate from the cache memory are used in combination for performing the parity check and a third specified number of ECC bits stored in the entry in the error protection cache are used for performing the ECC check.

22. The computing device of claim 15, wherein the cache controller functional block is configured to:
   when the portion of the cache memory is recorded as having an unknown number of bit errors, avoid storing, in the portion of the cache memory, data in a coherency state in which the data may be modified, and
   when storing the data in the portion of the cache memory is determined to be unavoidable, maintain a current copy of the data in a lower-level cache or memory.

23. The computing device of claim 14, further comprising:
   upon accessing data in the portion of the cache memory or evicting data from the portion of the cache memory, detecting, using one or more error detection mechanisms of the error protection, a number of bit errors in the portion of the cache memory; and
   based on the number of bit errors, updating the record to include an indication of the number of bit errors in the portion of the cache memory.

24. The computing device of claim 23, wherein the cache controller functional block is configured to:
   when a multi-bit bit error is detected in the portion of the cache memory, prevent the portion of the cache memory from being used for storing data.

25. The computing device of claim 14, further comprising:
   an error protection cache, the error protection cache having a number of entries that is smaller than a number of the plurality of portions in the cache memory, wherein some or all of the plurality of error protections rely on information that is stored in corresponding bits in an entry of the error protection cache, and wherein the entries in the error protection cache are dynamically associated with portions of the cache memory.

* * * * *